United States Patent
Stauffer et al.

(10) Patent No.: US 6,414,505 B1
(45) Date of Patent: Jul. 2, 2002

(54) MULTIBOARD RUN-IN TESTER FOR PCI EXPANSIONS

(75) Inventors: Titus D. Stauffer; Walter J. Belmore; Bryan A. Jones; Haissam H. Haidar, all of Houston, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/433,532

(22) Filed: Nov. 3, 1999

(51) Int. Cl.[7] .............................................. G01R 31/02
(52) U.S. Cl. ...................... 324/761; 324/754; 324/762
(58) Field of Search ................................. 324/761, 769, 324/555, 763, 158.1, 754, 760, 757, 72.5, 767, 758, 762; 710/128; 430/112

(56) References Cited

U.S. PATENT DOCUMENTS

| | | | | | |
|---|---|---|---|---|---|
| 4,168,527 A | * | 9/1979 | Winkler | ....................... | 324/537 |
| 4,621,322 A | * | 11/1986 | Suzuki | ......................... | 714/10 |
| 5,543,727 A | * | 8/1996 | Bushard | ..................... | 324/760 |
| 5,802,333 A | * | 9/1998 | Melvin | ........................ | 710/131 |
| 5,905,744 A | * | 5/1999 | Reise | .......................... | 714/821 |
| 5,937,173 A | * | 8/1999 | Olarig | ........................ | 710/128 |
| 6,081,863 A | * | 7/2000 | Kelley | ........................ | 710/129 |
| 6,127,834 A | * | 10/2000 | Eliashberg | ................. | 324/760 |
| 6,195,717 B1 | * | 2/2001 | Henderson | .................. | 710/101 |

* cited by examiner

Primary Examiner—Michael J. Sherry
Assistant Examiner—Trung Q Nguyen
(74) Attorney, Agent, or Firm—Conley, Rose & Tayon, P.C.

(57) ABSTRACT

A system for running in, in which multiple PCI bus connections are each bridged to multiple boards-under-test. The presence or absence of power in each of these bus connections is monitored, and the boards-under-test are correspondingly powered up (or not). Multiple test-bed subboards are preferably used, each with multiple sockets for receiving boards-under-test with high-insertion-force connectors, and the independent power control permits the boards-under-test on one subboard to be powered off and swapped while the boards-under-test on the other subboard are still being exercised. Preferable a single movable extractor mechanism is mounted on each subboard, and can be positioned (with respect to any one of the high-insertion-force connectors) for linear extraction of the board-under-test without any torque.

10 Claims, 10 Drawing Sheets

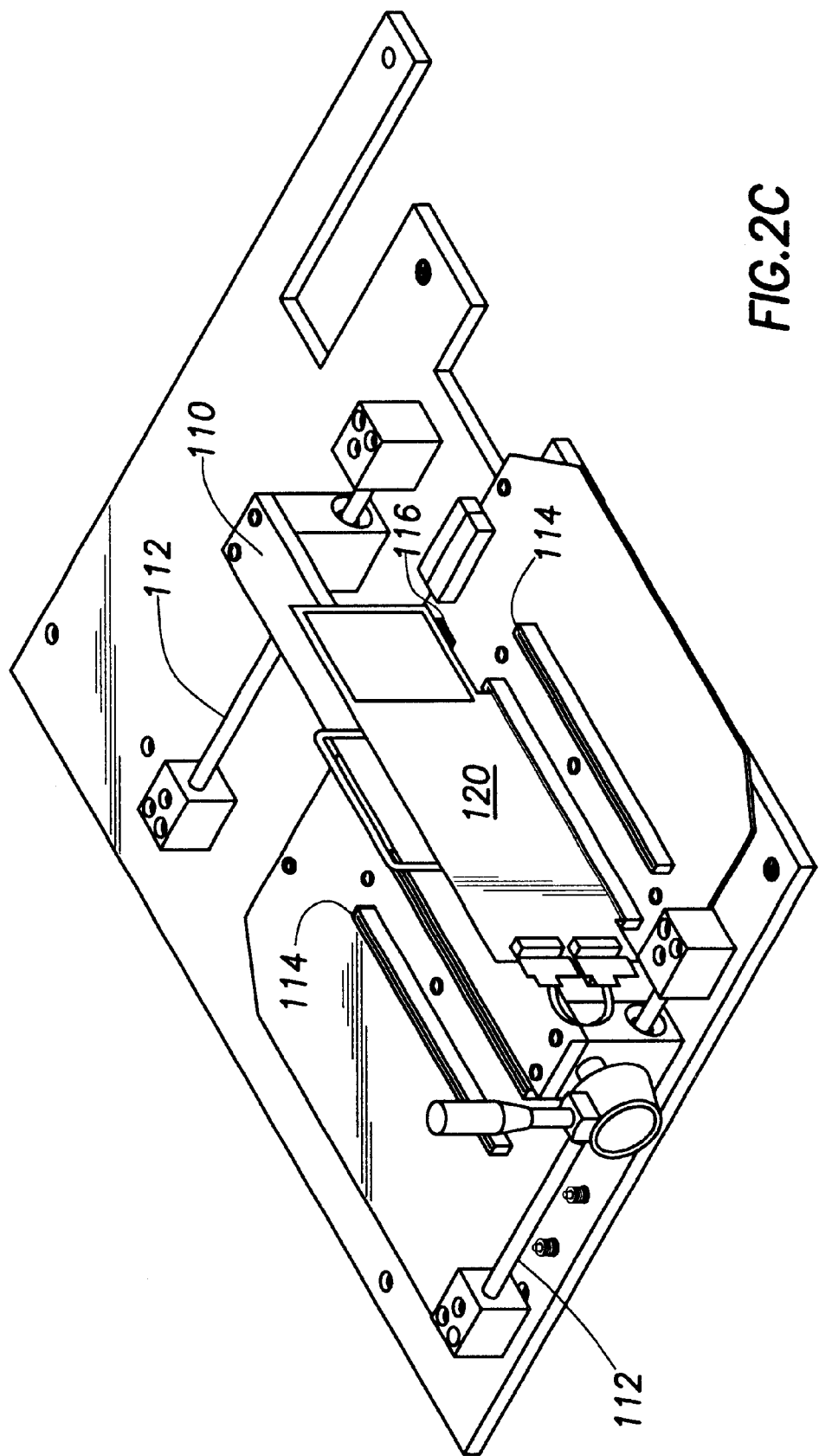

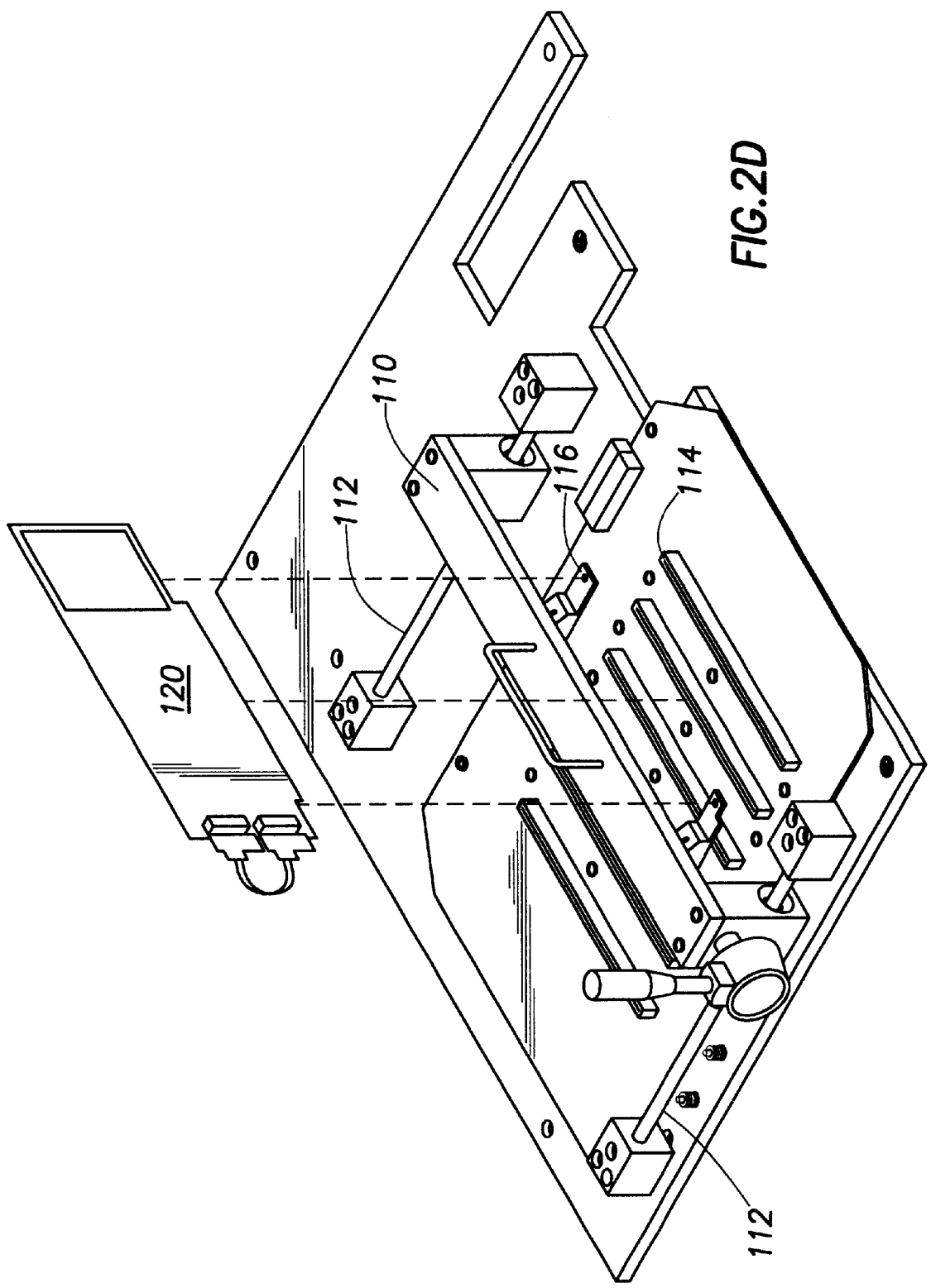

MULTIBOARD RUN-IN TESTER FOR PCI EXPANSIONS

BACKGROUND AND SUMMARY OF THE INVENTION

The present application relates to circuit board run-in, and specifically to run-in of server and/or workstation boards with high-insertion-force connectors.

Manufacturing Computers

In recent decades, rapid progress has been made in developing new "smart" manufacturing techniques. However, manufacturing of computers themselves, in production quantities, poses some additional difficulties.

Changing User Expectations

As the computer industry matures, users have come to increasingly demand turnkey convenience. In the mid-1970s personal computers could be sold as kits, for users to assemble and debug; and the few users who bought personal computers were interested and sophisticated enough to cope with (or at least tolerate) the high demands of such a system. However, as increasingly useful software has entered the computer market, and as the pool of users has steadily increased, this "hobbyist" attitude has become increasingly uncommon. In the 1990s, even a user who is able to cope with the demands of system configuration of a new system will normally not want to do so. (In this respect, computer buyers are becoming more and more analogous to car buyers: even those car buyers who are competent to wire up the ignition system of a new car would not want to do so.)

Background: Board Testing

In high-end personal computers, the boards which are assembled to the system board may be very complex (and may indeed contain a large fraction of the value of the system). The commonest types of such boards include: RAID controllers; remote server management boards; high-end graphics boards (particularly those with accelerated 3D rendering capabilities, and most especially those used for professional animation generation and/or video editing). Other types may include: numeric accelerator boards; hardware emulation units; some real-time control boards; other custom boards with one or more coprocessors; and RAM-based disk emulators.

If such an add-in board fails, the complete system becomes useless for its intended purpose. Moreover, when an add-in board contains a large fraction of the total chips in the system (or a large fraction of the total gates in the system), the likelihood of failure of the add-in board becomes a substantial contributor to the total likelihood of system failure. Thus when such high-end boards are used, system reliability depends critically on the board reliability. To meet high system reliability standards, system manufacturers must therefore assure that the reliability of high-end boards is adequate.

One of the hottest areas in personal computer development is file servers. Personal-computer-based file servers are being adapted to high-reliability and high-bandwidth applications. In many installations the failure of a single file server can stall dozens or hundreds of computer users, so the cost of failure is very high. Servers in such applications often include very complex add-in boards, such as RAID controllers with extensive buffering capacity. Thus in such applications the tolerance for failure is very low, while an add-in board may be a significant part of total system complexity.

As more high-end personal computers are bought by customers who would formerly have bought engineering workstations, this constraint becomes tighter: such customers are both more demanding of reliability and more likely to order high-end add-in boards. These applications too may combine a low tolerance for failure with the use of very complex add-in boards.

Background: "Infant Mortality" in Reliability Statistics

An odd feature of reliability is that many electronic components will fail relatively quickly. This is because a system may have a latent weakness which can pass the standard set of tests, but which becomes worse in service. A common example is an integrated circuit in which a power supply trace is necked down at one point; even though the wiring is not broken, and will pass normal electrical tests, the necked down location will be more susceptible to early failure due to electromigration. Many other failure mechanisms produce similar profiles. Thus it is common to see that a curve of unit failure rate will rapidly DECREASE during the first part of a unit's life, and then stay relatively constant for a very long time, until units begin to reach normal wearout failure. See generally, e.g., Eugene Hnatek, "Digital Integrated Circuit Testing from a Quality Perspective" (1993); Parag Lala, "Digital Circuit Testing and Testability (1997); Alexander Miczo, "Digital Logic Testing and Simulation" (1986); van de Goor, Testing Semiconductor Memories; Roy Longbottom, "Computer System Reliability" (1980); National Semiconductor Reliability Handbook (1979; 3.ed. 1987); Wayne Nelson, Accelerated Testing: Statistical Models, Test Plans, and Data Analyses (1990); Dimitri Kececioglu, Reliability and Life Testing Handbook (1993); Ashok K. Sharma, Semiconductor Memories (1998); John H. Lau et al., Solder Joint Reliability of Bga, Csp, Flip Chip, and Fine Pitch Smt Assemblies (1996); Forrest W. Breyfogle, Statistical Methods for Testing, Development, and Manufacturing (1992); C. E. Mandel, Environmental Stress Screening: A Tutorial (1985); Heinz P. Bloch et al., An Introduction to Machinery Reliability Assessment; Snehesh Kumar Sinha, Life Testing and Reliability Estimation; all of which are hereby incorporated by reference.

Because of the "infant mortality" phenomenon, it is common to perform "burn-in" or "run in" on electronic components. During such procedures, components are "exercised" under conditions which will tend to make latent early failures reveal themselves. (Every "infant mortality" failure which occurs during run in means one less angry customer.) The components may be continually cycled through tests during run in, or alternatively the components may simply be subjected to voltage and/or temperature stress under controlled environmental conditions and then retested separately.

Of course, one of the problems associated with burn-in of components is the test equipment necessary to perform this process. For example, if a test server can run diagnostics on only one or two boards at a time, the time and expense of burn-in is increased greatly over a test server which can burn-in a large number of boards at a time. As the boards themselves become more sophisticated, with specialized connectors and multiple bus connections necessary, supplying a test platform which can handle a large number of these boards becomes more difficult, but more necessary.

Hot-Swappable Multiboard Run-In Tester

The present application discloses systems, for running in boards-under-test, in which any one (or some, or all) of the following features are present:

the presence or absence of power in a bus socket is monitored, and replicated by paralleled power switching circuitry, to power up the boards-under-test only conditionally, and thereby control the application of power to multiple boards-under-test without overloading the power pins in the bus socket;

a complete operable personal computer is itself used as a testbed, and multiple bus sockets are each bridged to separate subsets of boards-under-test;

a movable extractor mechanism is positioned on a subboard which can receive multiple boards-under-test, so that by a step-and-repeat operation all boards-under-test can be rapidly extracted; and a special power-up timing relationship is implemented, so that the self-initialization operations (power-on-self-test etc.) of the board-under-test can begin before the circuitry on the testbed's bridge adaptor has finished its self-initialization operations.

A particular advantage of various disclosed embodiments is that computer boards can be run in very efficiently in a manufacturing floor environment.

Another advantage of various disclosed embodiments is that the ergonomics of board insertion and removal are greatly improved. This is highly advantageous in a computer manufacturing environment, where a technician may have to do hundreds of board insertion/removal operations in a single shift.

Another advantage of various disclosed embodiments is that the damage to boards with high-insertion-force connectors is essentially eliminated, since (with the disclosed extractor) connector separation during board removal is always linear.

Another advantage of various disclosed embodiments is that the "reach-up" geometry, positioning the sockets for the boards-under-test atop the computer testbed, permits other sockets in the computer to be used for other purposes if desired. In one example, other slots of the testbed computer can be used for PCI NIC boards.

BRIEF DESCRIPTION OF THE DRAWINGS

The disclosed inventions will be described with reference to the accompanying drawings, which show important sample embodiments of the invention and which are incorporated in the specification hereof by reference, wherein:

FIGS. 2C and 2D show the ejector ejecting a board-under-test from slot 5.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
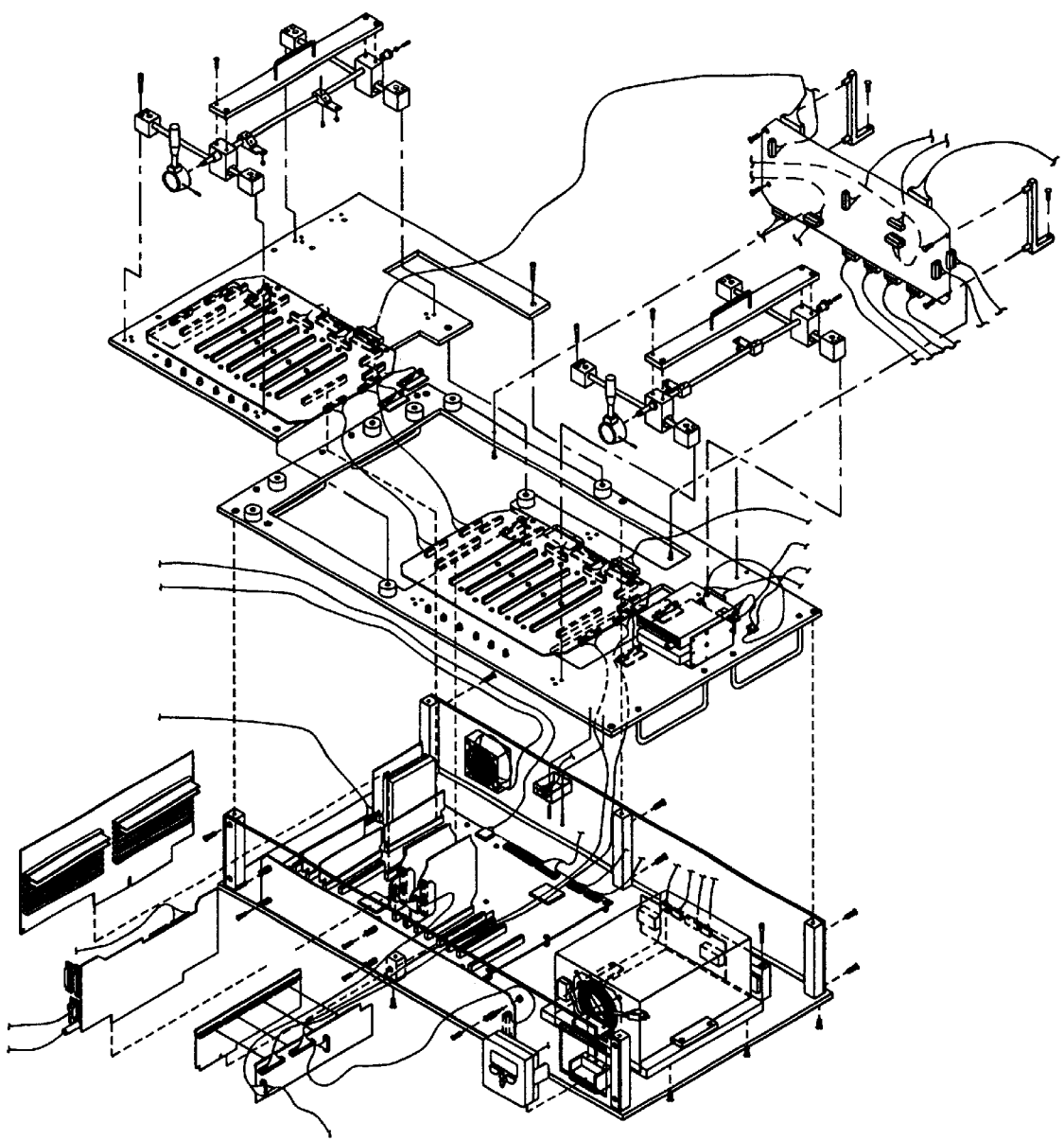
FIG. 1 is a single figure, much reduced, showing an overall isometric view of the presently preferred embodiment of the run-in tester.

FIG. 1 is an overall isometric view of the presently preferred embodiment of the disclosed tester. From this overall view, approximately the lower third of the drawing is the basic computer in which the tester is implemented; this is shown enlarged in FIG. 1A. The middle third of the drawing, as well as the left side of the upper third contain the hardware which will hold the boards-under-test and provide simplified extraction procedures; this is shown in more detail in FIG. 1B. Finally, the upper right-hand corner of the page is the board which handles power supply and switching; this is shown in FIG. 1C.

Figure 1A:
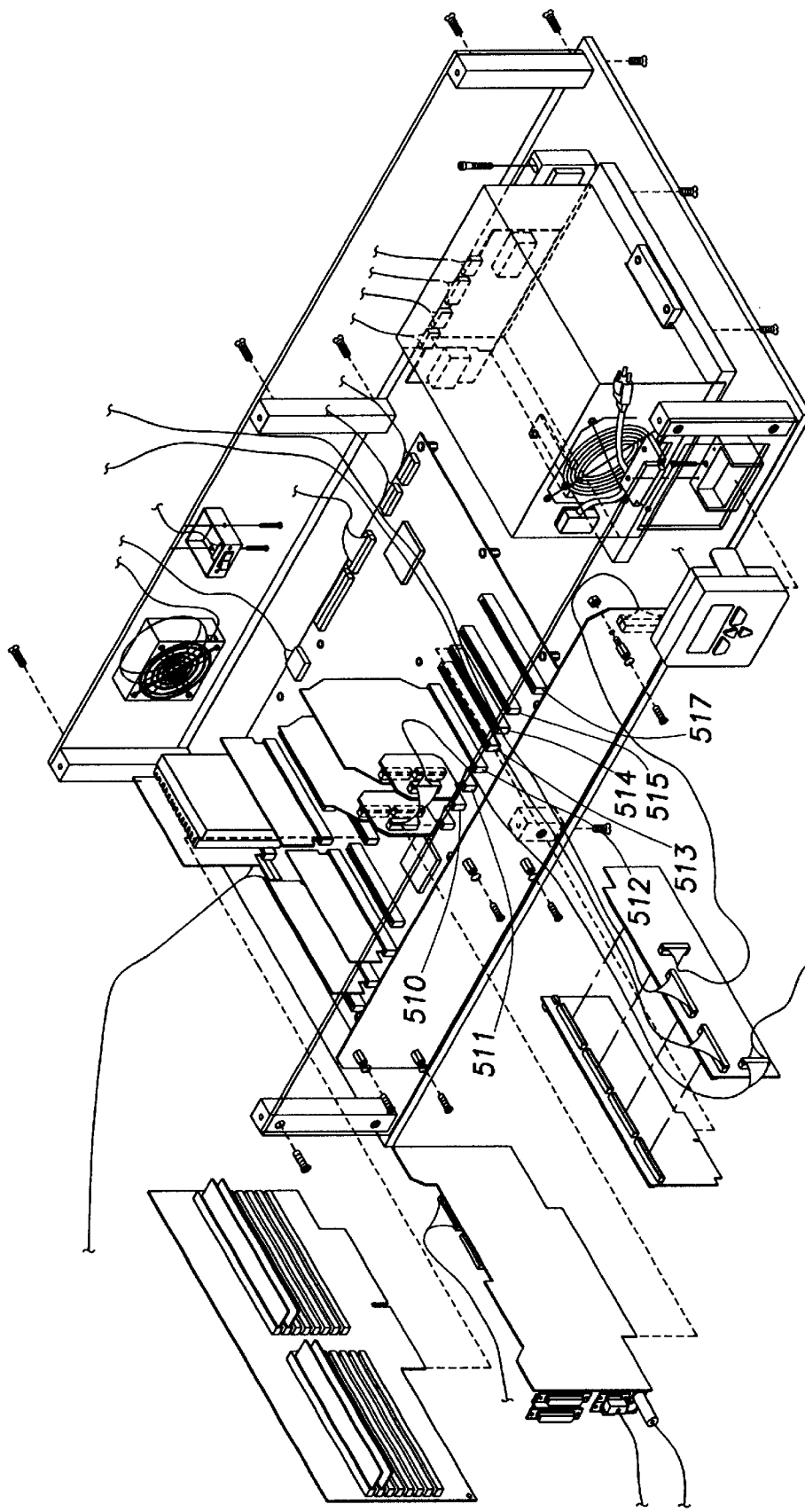
FIGS. 1A–E are enlargements of portions of FIG. 1.

Seen in FIG. 1A, the base computer of the presently preferred embodiment is a Compaq file server "Pocano" with 6 64-bit PCI slots J10-J15 (5 are hot-socketed) and one ISA slot J17. PCI-to-PCI male-male bridges are installed in two of the hot-swappable PCI slots. The bridges 2258 (long version) and 2281 (short version) are identical except that they are dimensioned to extend to different physical heights to make proper connections to two add-on boards. With this configuration, the remaining PCI slots are available for other desired boards.

Figure 1B:
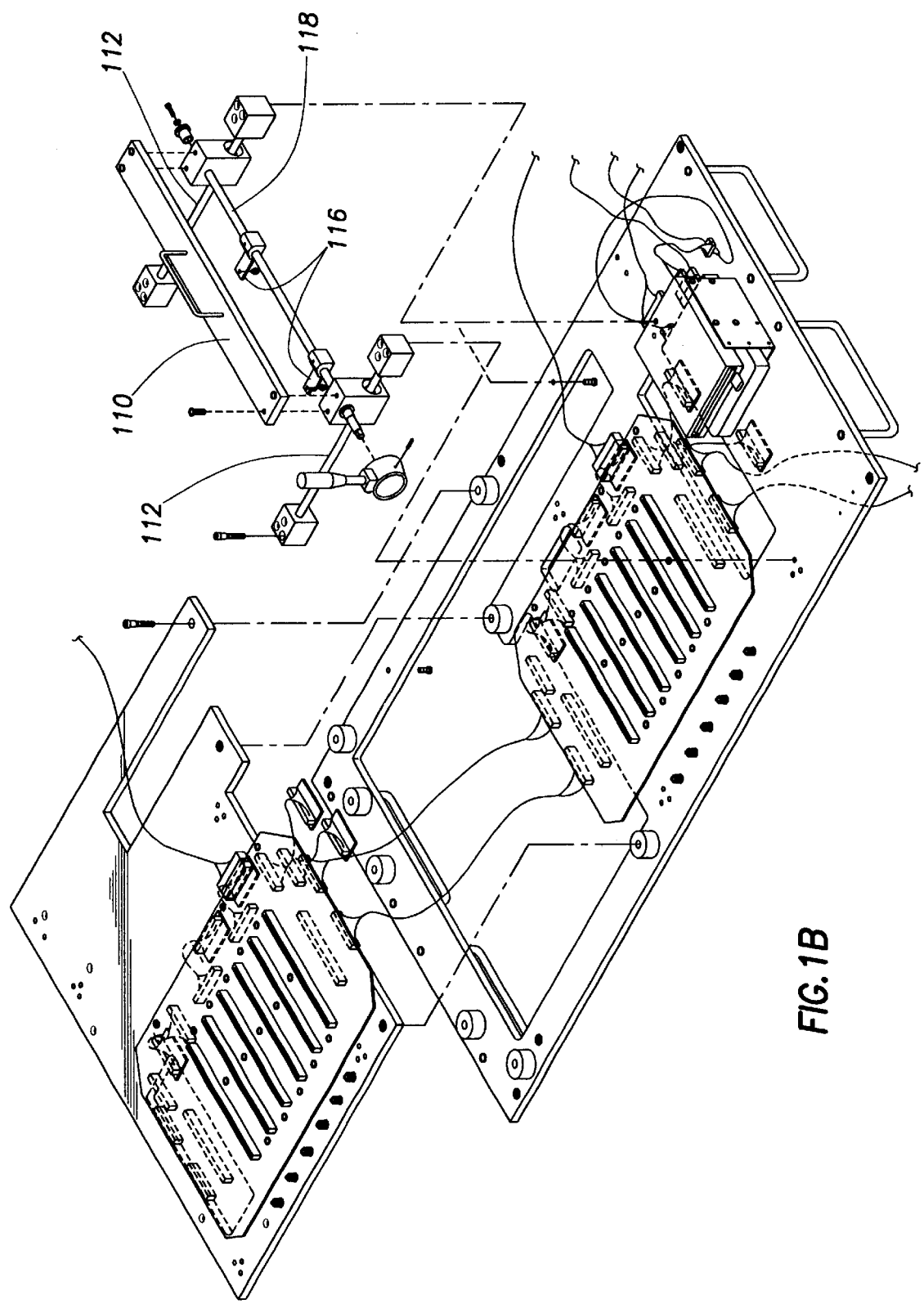
Figure 1D:
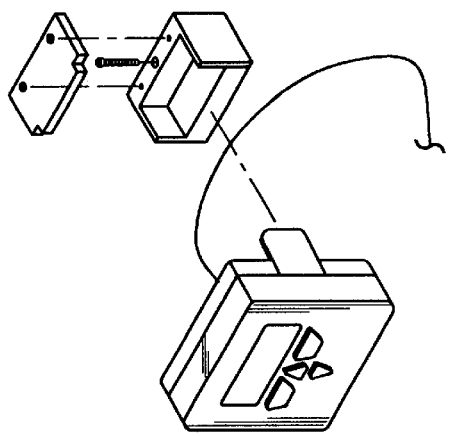
Figure 1E:
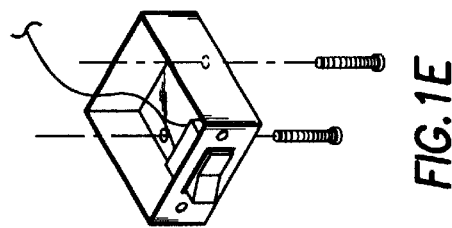
Figure 1C:
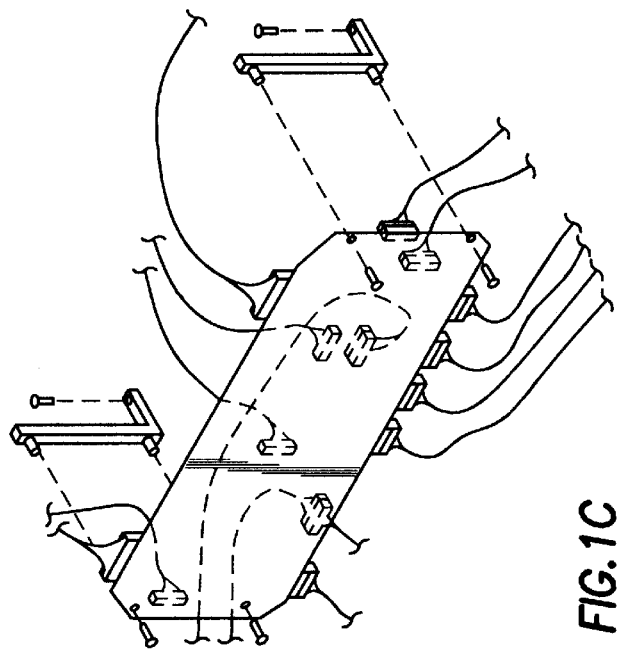

In FIG. 1B, two 2325 boards are shown, each of which have six slots for burning in boards-under-test. Boards 2325 are connected to the mother board 8278 by the PCI bridges 2258 and 2281.

The slots on the host which are occupied by the 2258 and 2281 bridges have DC current limits and are unable to handle the needs of the 6 units which will be tested on each of the boards connected to these bridges. Therefore, although the bridges are powered from host power to the PCI slots, the test units are powered by host power switched through power switches on a 2268 board, seen in FIG. 1C. Board 2268 is a power distributor and switch board which receives information regarding on/off status of the PCI slots and powers the boards-under-test accordingly. When one or both of the host PCI slots are powered on, test units slot boards 2325 will receive power. When both of the host's PCI slots are OFF, power to the test units will be turned off. The 2268 board ensures that enough current is available to supply all of the boards-under-test. (This would not necessarily be the case if all power came from the host slots.)

In some embodiments the 2268 board has also been used to prevent any condition in which the PCI bridges have live signals on one side of the bridge but not the other, and to prevent the bridges from being powered in a dead bus or unpowered in a live bus. However, it was found, surprisingly, that this was not ideal.

Normally a complex board will have firmware diagnostics built in, which provide power-on-self-test and other routines to be run at startup. When a computer system is powered up, it will normally run some POST routines before it powers up the PCI connectors, and there will be a further delay during which the signals on the PCI bus are ignored. The complex board will have finished its startup routines before the bus goes live. However, when a bridge card, which is not used during normal operation, is used (as described herein) for bridging to a boards-under-test, a delay problem can arise. The bridge circuitry itself will require some time for startup routines, and it has been found that the bridge circuitry's startup delay, if added onto the delay for the board-undertest, can produce an excessive total delay. Thus in some cases it was found that the system board was attempting to send valid data over the PCI bus before the boards-under-test were able to receive it.

Figure 4:
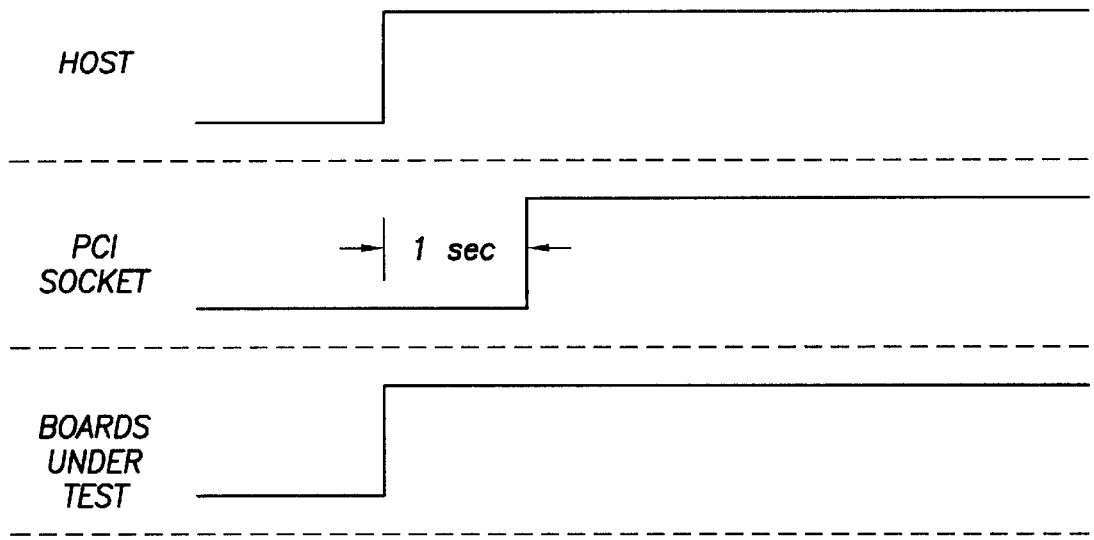
FIG. 4 shows the timing relationships in the power-on process of the presently preferred embodiment.

To avoid this problem, a further innovative feature is to use the independent power supply routing (through the 2268) to bring up the power to the boards-under-test just as soon as the main system power goes valid. This assures that the bridge AND the boards-under-test will have completed their startup routines within the available duration. This timing can be seen in FIG. 4. In this diagram, both the host power and the power to the boards-under-test turn on at the same time. Approximately 1 second later, the host will power-on the PCI socket.

Figure 5:
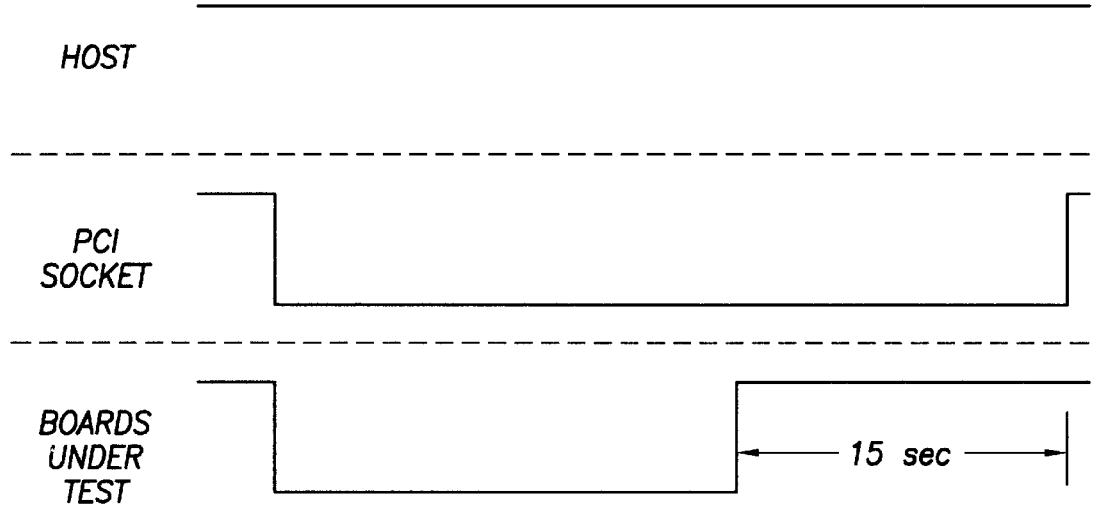
FIG. 5 shows the timing relationships when the boards-under-test are hot-swapped.

This offset timing also applied when boards are hot-swapped into the test sockets, seen in FIG. 5. while the host remains powered, power to the PCI socket and to the boards-under-test are turned off at the same time. However, the boards-under-test are cycled to power-on before the PCI socket receives power. In testing, where the total time for the PCI socket to be off was 30 second or more, a 1-second delay between power to the boards-under-test and power to the PCI socket was not sufficient to allow testing to proceed. The time between power to the boards and power to the socket was finally set to approximately 15 seconds, although this length of time is not required.

Board 2268, in the presently preferred embodiment, also controls status warning outputs (speaker and LED outputs).

The host computer's diagnostics can cycle power to the boards-under-test, without cycling the host's power. This enables both testing of battery-backed data on the boards-under-test, and hot-swapping of the boards connected to one expansion slot while testing of the other slot continues.

Note also that, in the presently preferred embodiment, provision is made to allow the host to swap back and forth between being a "5V host" and a "3.3V host".

Within boards 2325, no individual hot swap of boards-under-test is permitted; power to all 6 test units in a given 2325 board will be swapped simultaneously. Physically removing and replacing test units can be done in any manner so long as their slot power is off, however, removal in the presently preferred embodiment is described below.

Boards 1912 and 2257 (FIG. 1A) are parts of the test driver. Diagnostics can command various test parameters and read parameters back via these boards. The 1912/2257 board pair also drives "status" LEDs board 2264. The display board includes 3 LEDs for each slot (passed, failed, test-in-progress) plus AC applied to tester LED, host power on, test units power on, test mode v/s normal mode and 3.3V host v/s 5V host.

Figure 2A:
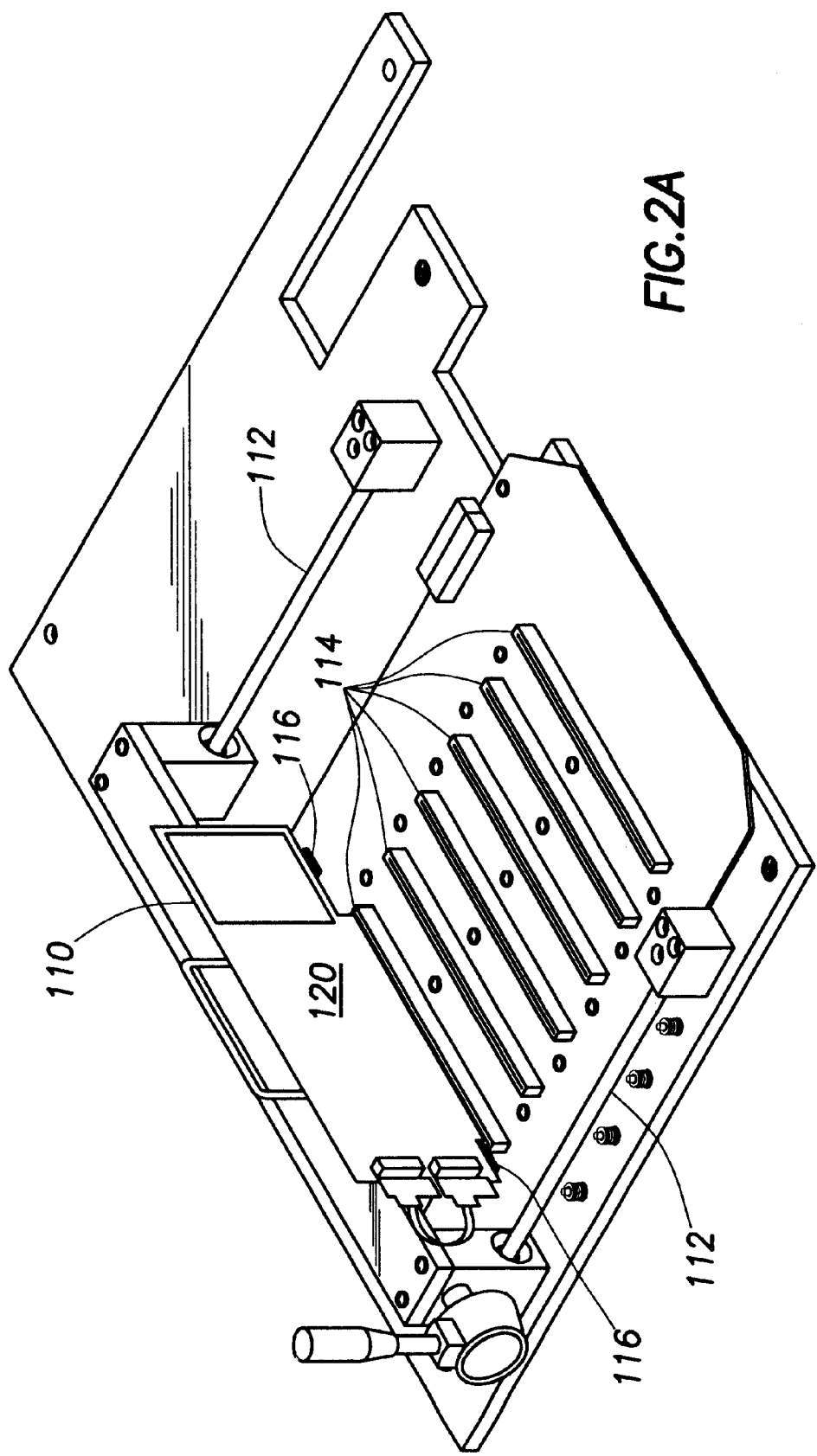
FIG. 2A shows the extractor unit positioned to eject a board-under-test from slot 1.

In the presently preferred embodiment, each of the boards 2325 is supplied with a mechanical device which will remove boards-under-test from their respective slots. The mechanical extractor is seen as exploded parts in FIGS. 1 and 1B. FIG. 2A shows one of the boards 2325 with the mechanical extractor in place, ready to remove a tested board which is mounted in the first slot. In this drawing, the body of the extractor 110 is mounted between two rails 112, which run perpendicular to the slots 114 into which the boards-under-test are placed. As the extractor moves along the rails, mechanical fingers 116, which are rotatably mounted to the body of the extractor via a rod 118, move under the edge of a board 120 which is to be removed. As the rod rotates, the fingers lift the board, smoothly removing it from its mounting without applying torque to the board. Although this extractor mechanism can be used to extract any type of circuit board, it is particularly helpful to remove boards which require high force for insertion and removal, as these boards are particularly susceptible to damage during their removal from the testing system.

Figure 2B:
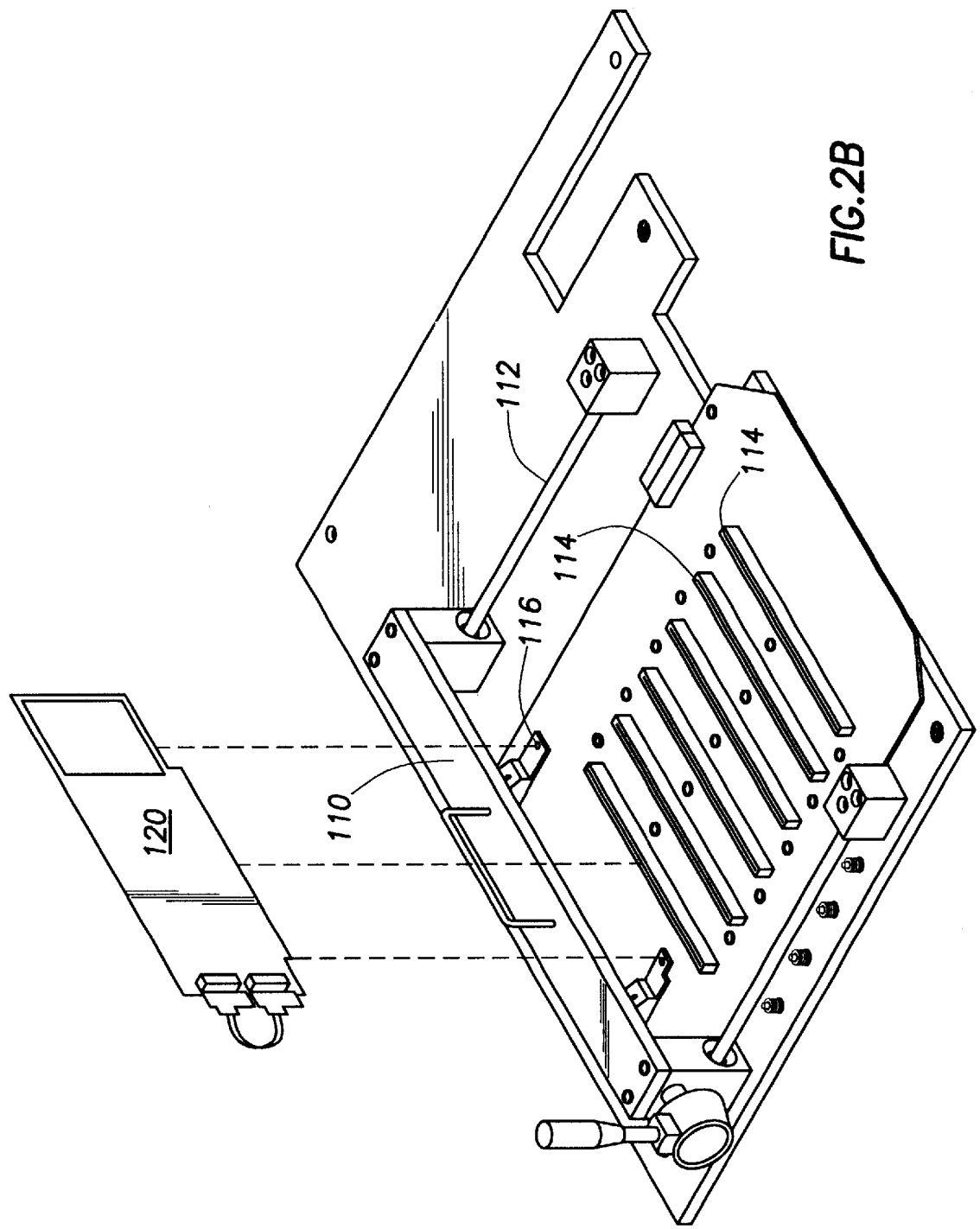
FIG. 2B shows the board-under-test moving out from that slot. Analogous
Figure 3:
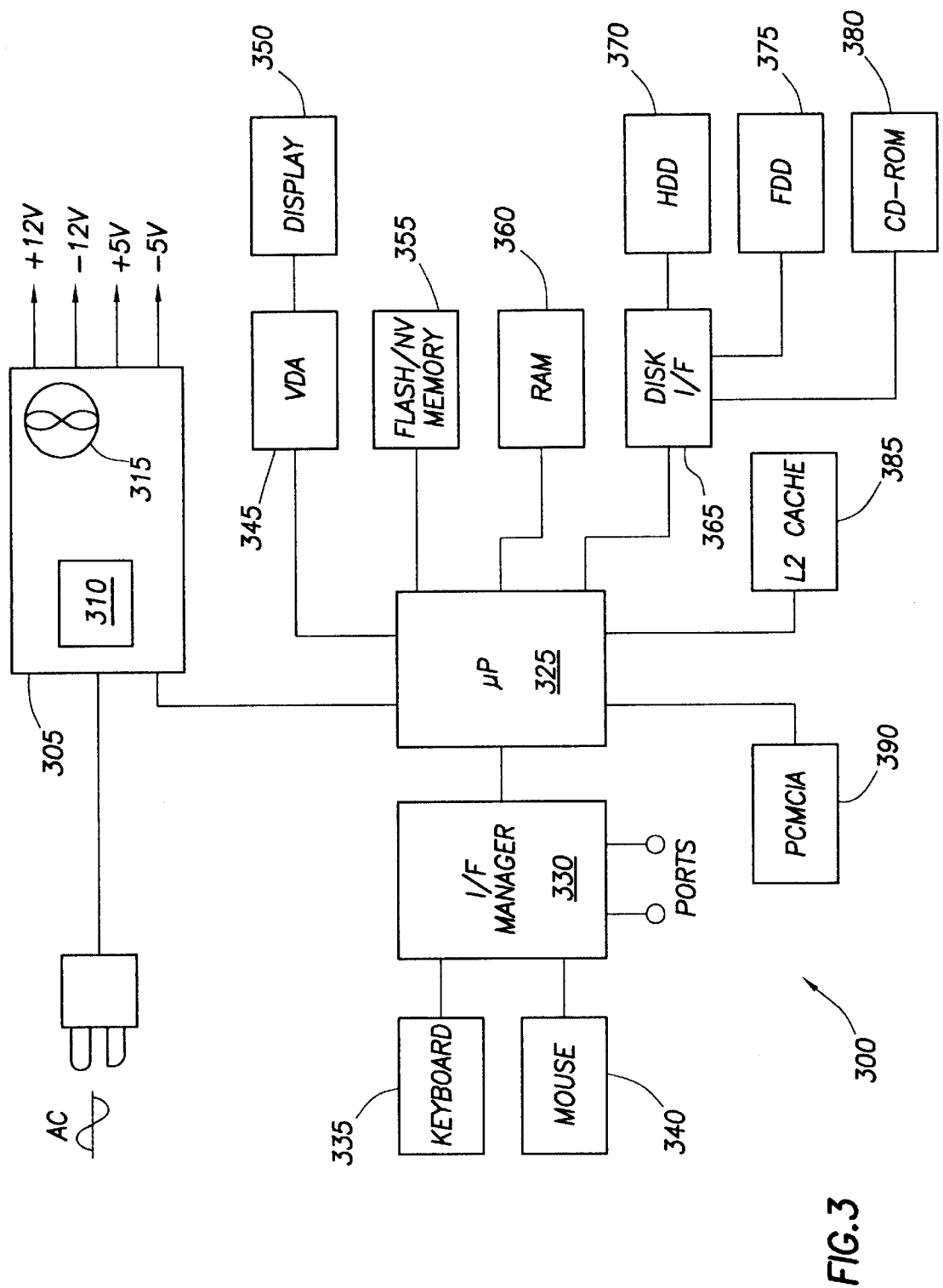
FIG. 3 shows a block diagram of a computer system which can be used to implement the testbed according to the presently preferred embodiment.

Note that the constrained travel of the ejector unit (along rails in this case) permits the extractor unit to be positioned with the same positioning relative to each slot (or, more precisely, to each slot from which mechanical ejection is needed). The board is seen in FIG. 2B after it has been extracted. Likewise, FIGS. 2B–C show the extractor positioned to remove a board in slot 5, and after removal.

In the presently preferred embodiment, the diagnostics are preferably firmware in the boards undergoing testing. This allows truly parallel testing in most cases, more intensive testing (i.e. more bus cycles exercised per test time.

The duration of run in varies with the failure statistics and degree of reliability needed. In the presently preferred embodiment, run in times of 3 to 10 hours are typically used, but of course these times can be longer if desired. During most of this time the boards-under-test will be running diagnostics, while periodically being polled for status. However, in the presently preferred embodiment, the run in time is also used to run power cycles on the boards-under-test (without power cycling the host), and also to power cycle the complete system (host and boards-under-test).

In an alternate embodiment, PCI expansion units (e.g., one in each of the 12 slots of cards 2325) are part of the test equipment, and up to 48 SCSI storage boxes are run-in tested at a time using the disclosed test system.

Definitions

Following are short definitions of the usual meanings of some of the technical terms which are used in the present application. (However, those of ordinary skill will recognize whether the context requires a different meaning.) Additional definitions can be found in the standard technical dictionaries and journals.

API: Application Programming Interface, which allows an application to request that the operating system perform an action or a set of actions. Here, the MAPI (Mail API) launches the user's email system, given the required information.

Bridge: A hardware unit which provides a bus connection between two busses (or between two network). For example, a PCI to PCI bridge provides a connection path between two independent PCI busses, so that transactions can occur between a master on one PCI bus and a target on the other PCI bus.

Computer: A electronic system which includes one or more programmable processors which execute instructions in a dynamically reconfigurable sequence.

Hardware: the physical, tangible components of a computer system.

Interconnect (in the context of network or cluster architecture) refers to a communication link used for intra-cluster status info such as heartbeats. This can be a typical Ethernet system, and in the preferred embodiment, the power mains are used as a backup interconnect.

Operating system: a set of programs controlling the operations of a computer system, such as assemblers or input and output facilities.

PCI: a bus standard commonly used in personal computers.

Power mains refers to the power mains systems in common use in all industrialized countries. In the United States, for example, this would refer to the common indoor power outlets which supply current at 60 Hz and (for most circuits) about 120V; in the U.K. this would refer to the common indoor power outlets which supply current at 50 Hz and 240V.

Primitives: basic operations performed by the operating system, such as writing to the hard disk, putting graphics on the screen, or reading data from the CDROM port.

Processor complex: a processor and its local L2 cache subsystem.

SCSI (Small Computer Systems Interfaces)—a commonly-used bus architecture which allows multiple devices to daisy chain on a common bus.

According to a disclosed class of innovative embodiments, there is provided: A system for running in computer boards-under-test, comprising: a computer system including at least one bus connector with at least one switchable power connection therein; a board operatively connected to said bus connector, and having multiple further bus connections which are operatively connected to said bus connector through said board; and power switching circuitry which supplies power to said further bus connections only conditionally, in dependence on the state of said switchable power connection, with current routing which at least partially bypasses said switchable power connection; whereby boards-under-test can be hot-swapped into said further bus connections for run-in.

According to another disclosed class of innovative embodiments, there is provided: A system for running in boards-under-test which have high-insertion-force connectors, comprising: a board having multiple high-insertion-force bus connections thereon, for receiving the boards-under-test; and an extraction mechanism which is mechanically mounted to said board with a constrained motion which permits the mechanism to be oriented to a selected one of said bus connections, and contains one or more movable extractors which selectably apply force to remove the board-under-test from the selected one of said bus connections with a force which is substantially balanced, with respect to the selected bus connection, to not apply torque to the board-under-test; whereby boards-under-test can be swapped into and out of said high-insertion-force bus connections for run-in.

According to another disclosed class of innovative embodiments, there is provided: A method for running in computer boards-under-test, comprising the actions of: connecting multiple boards-under-test to a board which in turn is connected, through a bridge, to a bus connector on a substantially normal computer system board; wherein at least some ones of said boards-under-test have built-in initialization routines which are optimized for direct insertion into a bus connector, without any intervening bridge; and when said system board is powered up, powering up said boards-under-test BEFORE said bus connector is powered up by said system board.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, the disclosed inventions are not limited to PCI bus connections, nor to modification of PCI bridge functions.

For example, the power-up conditions which are implemented by the disclosed functions of board 2268 can optionally be modified, e.g. to prevent any condition in which the PCI bridges will have live signals on one side of the bridge but not the other, and/or to prevent the bridges from being powered in a dead bus or unpowered in a live bus.

Of course, in implementing power supply circuits and systems, safety is a very high priority. Those of ordinary skill in the art will therefore recognize the necessity to review safety issues carefully, and to make any changes in components or in circuit configuration which may be necessary to improve safety or to meet safety standards in various countries.

Additional general background, which helps to show the knowledge of those skilled in the art regarding the system context, and of variations and options for implementations, may be found in the following publications, all of which are hereby incorporated by reference. In particular, many details may be found in the books from MindShare, Inc., including Protected Mode Software Architecture, Cardbus System Architecture, Eisa System Architecture, ISA System Architecture, 80486 System Architecture, Pentium Processor System Architecture, PCMCIA System Architecture, Plug and Play System Architecture, PCI System Architecture, USB System Architecture, and Pentium Pro Processor System Architecture, all of which are hereby incorporated by reference, and in the Pentium Processor Family Developer's Manual 1997, the Multiprocessor Specification (1997), the Intel Architecture Optimizations Manual, the Intel Architecture Software Developer's Mnaual, the Peripheral Components 1996 databook, the Pentium Pro Processor BIOS Writer's Guide (version 2.0, 1996), and the Pentium Pro Family Developer's Manuals from Intel, all of which are hereby incorporated by reference.

What is claimed is:

1. A system for running in boards-under-test, the system comprising:
    a board having multiple bus connections thereon, for receiving the boards-under-test; and
    an extraction mechanism which is
        mechanically mounted to said board with a constrained motion which permits the mechanism to be oriented to a selected one of said bus connections, and
        contains one or more movable extractors which selectably apply force to remove the board-under-test from the selected one of said bus connections with a force which is substantially balanced, with respect to the selected bus connection, to not apply torque to the board-under-test;
    whereby boards-under-test can be swapped into and out of said bus connections for run-in.

2. The system of claim 1, further comprising circuitry for selectively powering down some but not all of said computer boards-under-test, whereby boards-under-test can be hot-swapped into and out of said bus connections for run-in.

3. A run-in tester comprising:
    a motherboard having multiple bus connector slots;
    a first bus bridge card inserted in a first bus connector slot on the motherboard;
    a second bus bridge card inserted in a second bus connector slot on the motherboard,
        wherein the second bus bridge card is taller than the first bus bridge card;
    a first add-on board connected to the first bus bridge card,
        wherein the first add-on board includes a first set of bus connector slots for receiving boards-under-test;
    a second add-on board connected to the second bus bridge card, wherein the second add-on board includes a second set of bus connector slots for receiving boards-under-test; and a power switch board coupled to the motherboard, the first add-on board, and the second add-on board, wherein upon system power-on, the power switch board is configured to provide power to the first and second add-on boards before power is supplied to the first and second bus connector slots on the motherboard.

4. The run-in tester of claim 3, wherein the first and second bus bridge cards are tall enough to provide sufficient clearance between the motherboard and the add-on boards for use of remaining bus connector slots.

5. The run-in tester of claim 3, wherein the first and second add-on boards each have an associated mechanical extractor configured to remove boards-under-test from respective bus connector slots.

6. The run-in tester of claim 3, wherein the power switch board is coupled to the first and second bus connector slots on the motherboard to detect a power status for each of the first and second bus connector slots, wherein when the power status for a bus connector slot transitions from ON to OFF, the power switch board is configured to block power to the corresponding add-on board for a time, and to return power to the corresponding add-on board a predetermined time before the power status of the bus connector slot transitions from OFF to ON.

7. The run-in tester of claim 6, wherein the predetermined time is approximately 15 seconds.

8. The run-in tester of claim 6, wherein the predetermined time is greater than 1 second.

9. The run-in tester of claim 3, wherein the first and second set of bus connector slots each consists of six slots.

10. The run-in tester of claim 5, wherein each mechanical extractor includes:

a pair of rails mounted transversely to the set of bus connector slots;

an extractor body slidably mounted between the pair of rails;

two mechanical fingers rotatably mounted to the extractor body via a rod, wherein the fingers move between a board-under-test and the add-on board and rotate to separate the board-under-test from the add-on board without applying torque to the board-under-test.

* * * * *